United States Patent [19]

Nye et al.

[11] Patent Number: 5,698,654
[45] Date of Patent: Dec. 16, 1997

[54] PROCESS FOR PREPARING HYDROGEN SILOXANE COPOLYMERS

[75] Inventors: Susan A. Nye, Feura Bush; Donna A. Riccio, Watevliet; Brenda S. Wutzer, Loudonville, all of N.Y.

[73] Assignee: General Electric Company, Pittsfield, Mass.

[21] Appl. No.: 688,578

[22] Filed: Jul. 30, 1996

[51] Int. Cl.$^6$ .................................................. C08G 77/04
[52] U.S. Cl. .................. 528/21; 528/14; 528/23; 528/37
[58] Field of Search .................. 528/21, 37, 14, 528/23

[56] References Cited

U.S. PATENT DOCUMENTS

| | | |
|---|---|---|
| 2,830,967 | 4/1958 | Nitzsche et al. . |
| 3,186,967 | 6/1965 | Nitzsche et al. . |
| 3,839,388 | 10/1974 | Nitzsche et al. . |
| 4,339,564 | 7/1982 | Okamura ................................ 528/15 |
| 4,725,643 | 2/1988 | Burkhardt . |
| 4,888,405 | 12/1989 | Gamon et al. . |
| 4,975,510 | 12/1990 | Wegehaupt et al. . |
| 5,008,229 | 4/1991 | Schuster et al. . |
| 5,210,131 | 5/1993 | Gilson ................................ 524/863 |
| 5,272,225 | 12/1993 | Ogawa et al. ................... 525/474 |
| 5,403,909 | 4/1995 | Rubinsztajn . |
| 5,420,221 | 5/1995 | Razzano et al. . |

FOREIGN PATENT DOCUMENTS

| | | |
|---|---|---|
| 0-444-960-A2 | 9/1991 | European Pat. Off. . |
| 2 252 969 | 8/1992 | United Kingdom . |

Primary Examiner—Ralph H. Dean
Attorney, Agent, or Firm—Kenneth S. Wheelock

[57] ABSTRACT

A sequential catalysis of the ring opening polymerization of cyclic organosiloxanes using a base catalyst that can be neutralized by a subsequent redistribution and condensation catalyst such as a Lewis acid catalyst, preferably a phosphonitrilic compound, permits the rapid synthesis of functionalized and poly-functionalized silicone copolymers such as alkenyl hydride copolymers, a new composition of matter.

10 Claims, No Drawings

PROCESS FOR PREPARING HYDROGEN SILOXANE COPOLYMERS

FIELD OF THE INVENTION

The present invention relates to a catalyst and process for the preparation of hydrogen siloxane copolymers. The process of the present invention makes possible the synthesis of new compositions of matter, mixed silicone polymers possessing mixed functionalities.

BACKGROUND OF THE INVENTION

Polydimethylsiloxane fluids may be conveniently prepared by any of several synthetic methods. A common and widely used industrial process to prepare such fluids involves the hydrolysis of halo-functional silanes followed by condensation. A second process begins with cyclic organosiloxanes utilizing a ring-opening polymerization to produce either a kinetically or equilibrium controlled mixture of linear and cyclic organosiloxane compounds.

Ring-opening polymerization of cyclic organosiloxanes may be accomplished by either acid or base catalysis. The catalysts that have been successfully employed range from very acidic catalysts such as trifluoromethane sulfonic acid to very basic such as potassium hydroxide or potassium silanolate. A wide variety of acid catalysts have been employed to catalyze ring opening polymerization, sulfuric acid, acid washed clays, acidic ion exchange resins and linear phosphonitrilic chlorides (LPNC).

While ring opening polymerization may be accomplished with either an acidic or basic catalyst, the preparative chemistry of hydrogen containing siloxanes (i.e. silyl hydrides) is restricted to the acidic catalysts. When a basic catalyst is used, the ring opening polymerization proceeds, but base catalyzed hydride abstraction produces hydroxy functionalities in place of the hydrogen functionalities and the material condenses through the silanol groups. While this produces a polymer, it produces a cross-linked polymer in contrast to a linear polymer.

Process considerations in the choice of an acidic catalyst for the preparation of hydrogen organosiloxanes tend to require the milder acid catalysts in contrast to sulfuric acid and trifluoromethane sulfonic acid because these acids are very strong and highly corrosive. The use of such strong acids requires the use of special alloys in process vessels to avoid acid induced corrosion and contamination of the resulting product.

Milder acid catalysts such as the acid washed clays and acidic/on exchange resins possess drawbacks that while avoiding the corrosion and contamination problems associated with strong acid attack on metal process vessels, cause other problems. The acidic ion exchange resins do not maintain catalytic activity well for any significant and economically useful period of time, requiring frequent regeneration or refreshment. Acid washed clays are generally used as powders to improve contacting efficiency between the reaction substrate and the catalyst which necessitates a downstream filtration to remove the acid washed clay catalyst fines from the product. Further, acid washed clays generally contain residual amounts of water that contributes to a hydride silanol interchange that results in a gradual and undesired condensation polymerization of the hydride product. By comparison to the stronger acid catalysts, these milder acid catalysts suffer from lower reaction rates and thus a lower production of product per unit time at any given temperature.

While the kinetic rate deficiencies of any given catalyst may be offset by an increase in temperature, this solution has at least two serious drawbacks. The first is that as temperature is changed, i.e. increased, the relative proportions of reactants, desired products and undesired by-products change. This change may either benefit the desired process or be a detriment depending on the relative amounts of the desired product as a function of the increased temperature because the equilibrium constant for the reaction is a function of temperature. As the temperature is increased, the amount of energy furnished the reaction to increase the temperature must be increased (for endothermic reactions) and this almost always adversely affects the process economics. There is thus a complex balancing between the desired reaction rate, the desired product mix, catalyst activity and process operating variables.

In contrast to the acid catalysts that must either be neutralized, e.g. sulfuric acid, or separated from the product, e.g. acid washed clays, phosphonitrilic halides, particularly linear phosphonitrilic chlorides (LPNC), have found particular use for the redistribution and condensation of organosiloxane oligomers. These LPNC catalysts may be used at fairly low levels in the reaction being catalyzed, e.g. between 25 and 2,000 ppm. An additional advantage is that the catalyst may be left in the product and thermally deactivated if desired. This procedure usually does not result in any significant contamination of the product.

While the LPNC catalysts have been particularly useful for redistribution and condensation reactions involving silicones and siloxanes, they have not usually been used for ring opening polymerization because of the low rates associated with these catalysts in reactions of this type. While it is possible to achieve acceptable reaction rates in the synthesis of hydride siloxane organosiloxane copolymers when the hydride level is above approximately 1,000 ppm, the rate of ring opening polymerization in the presence of a low hydride level siloxane (~300 ppm) is extremely slow requiring a matter of days as opposed to hours. Thus LPNC materials would not be expected to be particularly well suited to catalyze ring opening polymerization in the presence of low hydride content siloxanes to make low hydride content siloxane polymers.

SUMMARY OF THE INVENTION

The process of the present invention comprises a ring opening polymerization of cyclic siloxane catalyzed by a basic catalyst that may be neutralized by a phosphonitrilic halide followed by a phosphonitrilic halide catalyzed condensation and redistribution reaction between the polymerization product of the cyclic siloxane and a low molecular weight functionalized silicone to produce a functionalized copolymer. Because the first catalyst used in the process may be neutralized by the second catalyst, the process may be accomplished in a single reaction vessel.

Thus the present invention provides for a process for the production of siloxane copolymers comprising:

(a) polymerization of a cyclic siloxane and an M rich siloxane in the presence of a basic catalyst to produce a polymeric siloxane;

(b) neutralization of the basic catalyst with an excess of a catalytic Lewis acid compound; and (c) reacting a second siloxane with the polymeric siloxane in the presence of the catalytic Lewis acid compound producing thereby a copolymeric siloxane. The preferred Lewis acid catalysts are selected from the group consisting of:

1) $(X_3P(NPX_2)_nPX_3)^+PX_6^-$ where n is an integer of from 1 to 6 and X is a halide;

2) $(X_3P(NPX_2)_n NPX_3)^+ PX_6^-$ where n is an integer of from 1 to 6 and X is a halide;

3) $(X_3P(NPX_2)_n NPX_3)^+ EX_m^-$ where E is an element having an electronegativity value of from 1.2 to 2 with m an integer of from 3 to 8 and X is a halide;

4) $O(X)_{2-a} Y_a P(NPX_2)_b NPX_{3-c} Y_c$ where b is an integer ranging from 0 to 8, a is 0 or 1, c is 0 or 1, Y is OH, OR' or R'CO$_2$ where R' is alkyl or aryl and X is a halide;

5) $O(X)_{2-a} Y_a P(NPX_2)_b NP(O)X_{2-c} Y_c$ where b is an integer ranging from 0 to 8, a is 0 or 1, c is 0 or 1, Y is OH, OR' or R'CO$_2$ where R' is alkyl or aryl and X is a halide;

6) $X_{3-p}(HO)_p P(NPX_2)_m NP(O)X_2$, where m is an integer ranging from 0 to 6 and p is 0 or 1 and X is a halide; and 7) $X_3 P(NPX_2)_m NPX_2(O)$ where m values can vary from 0 to 6 and X is a halide.

Further, the process of the present invention provides for a new class of siloxane polymers having the formula: $M_u D_q T_r Q_s$, having at least two $D_q$ where each $D_q$ is different from every other $D_q$ and each $D_q$ has the formula: $D_q = SiR^1 R^2 O_{2/2}$ where each $R^1$ and $R^2$ in each $D_q$ is independently selected from the group consisting of hydrogen and one to forty carbon atom monovalent hydrocarbon radicals where each subscript q of $D_q$ is independently one or greater with $M = R^4 R^5 R^6 SiO_{3/2}$ where $R^4$, $R^5$ and $R^6$ are each independently selected from the group consisting of hydrogen and one to forty carbon atom monovalent hydrocarbon radicals where the stoichiometric subscript u of M is non-zero and positive;

$T = R^7 SiO_{3/2}$ where $R^7$ is selected from the group consisting of hydrogen and one to forty carbon atom monovalent hydrocarbon radicals with the stoichiometric subscript r of T zero or positive; and $Q = SiO_{4/2}$ with the stoichiometric subscript s of Q is zero or positive; subject to the limitation that one of $R^1$, $R^2$, $R^4$, $R^5$, $R^6$, and $R^7$ is hydrogen and that one of $R^1$, $R^2$, $R^4$, $R^5$, $R^6$, and $R^7$ which is not hydrogen is an alkenyl group having from two to forty carbon atoms.

DETAILED DESCRIPTION OF THE INVENTION

We now disclose that silanolate catalysts may be used for an initial ring opening polymerization reaction of cyclic organosiloxanes followed by the introduction of phosphonitrilic halide catalyst and hydrogen containing organosiloxane for the subsequent redistribution and condensation reaction to produce a hydrogen containing organosiloxane copolymer conducted in the same reaction vessel.

Thus the process of the present invention comprises the following steps:

$D_x$  $HOSiR^2(D_q)SiR^1R^2OH$     1)

where $D = SiR^1 R^2 O_{2/2}$ with $R^1$ and $R^2$ independently selected from one to forty carbon atom monovalent hydrocarbon radicals and q>x, with x generally ranging as follows $3 \leq x \leq 8$. The base catalyst may be any generally known in the art to polymerize cyclic organosiloxanes, however, the catalyst must be capable of neutralization by an acidic species, either Arrhenius acid, Bronsted acid or Lewis acid. The preferred acidic neutralization agent is a Lewis acid selected from the group of phoshonitrilic halides. Catalysts such as an alkali metal silanolate, an alkali metal hydroxide, and tetra-organo-substituted ammonium hydroxide such as tetramethyl ammonium hydroxide and the like are preferred.

2) Base catalyst (from reaction 1))+Lewis acid catalyst→neutralization complex,

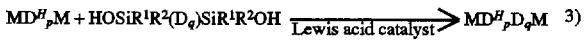

where $D^H = SiR^3 HO_{2/2}$ where $R^3$ is selected from one to forty carbon atom monovalent hydrocarbon radicals (alternatively $D^H = SiR^1 R^2 O_{2/2}$ with $R^1$ and $R^2$ selected from the group of hydrogen and one to forty carbon atom monovalent hydrocarbon radicals where one of $R^1$ and $R^2$ is hydrogen) and where $M = R^4 R^5 R^6 SiO_{1/2}$ where $R^4$, $R^5$ and $R^6$ are each independently selected from the group consisting of hydrogen and one to forty carbon atom monovalent hydrocarbon radicals where the subscripts p and q are positive integers independently ranging from about 1 to about 1,000, preferably from about 1 to about 700, more preferably from about 1 to about 500, and most preferably from about from about 1 to about 400. It is to be noted that the process of the present invention is most advantageous when it is desired to make copolymers having fairly low levels of hydride present, i.e. when the stoichiometric subscript q in the copolymer is very much larger than the stoichiometric subscript p.

The Lewis acid catalyst for reaction 3) is selected from the group of phosphonitrilic halide catalysts as disclosed and taught in U.S. Pat. No. 5,420,221; as well as those and including but not limited to:

$(X_3P(NPX_2)_n PX_3)^+ PX_6^-$ where n is an integer of from 1 to 6 and X is a halide selected from the group consisting of F, Cl, Br, and I;

$(X_3P(NPX_2)_n NPX_3)^+ PX_6^-$ where n is an integer of from 1 to 6 and X is a halide selected from the group consisting of F, Cl, Br, and I;

$(X_3P(NPX_2)_n NPX_3)^+ EX_m^-$ where E is an element having an electronegativity value of from 1.2 to 2 such as Al, Sb, P, Sn, Zn and Fe with m an integer of from 3 to 8;

$O(X)_{2-a} Y_a P(NPX_2)_b NPX_{3-c} Y_c$ where b is an integer ranging from 0 to 8, a is 0 or 1, c is 0 or 1 Y is selected from the group consisting of OH, OR' and R'CO$_2$ where R' is alkyl or aryl;

$O(X)_{2-a} Y_a P(NPX_2)_b NP(O)X_{2-c} Y_c$ where b is an integer ranging from 0 to 8, a is 0 or 1, c is 0 or 1, X is a halogen selected from the group consisting of fluorine, chlorine, bromine, and iodine, Y is selected from the group consisting of OH, OR' and R'CO$_2$ where R' is alkyl or aryl;

$X_{3-p}(HO)_p P(NPX_2)_m NP(O)X_2$, where X is a halogen selected from the group consisting of F, Cl, Br, and I, and m is an integer ranging from 0 to 6 and p is 0 or 1; and $X_3 P(NPX_2)_m NPX_2(O)$ where m values can vary from 0 to 6.

It is preferred that the initial ring opening polymerization be conducted in the presence of an M rich chain terminating source. Thus while is it is preferred to utilize short chain low molecular weight M rich compounds to control the equilibrium distribution of polymer, the use of M rich compounds of greater structural complexity such as those incorporating T or Q branching points thus produces branched polymers. The reaction of the product polymer, either as the linear or branched polymer, with the hydride of reaction 3) produces a copolymer that is likewise linear or branched. The molar ratio of M rich siloxane compound to cyclic siloxane compound governs the equilibrium distribution of the resulting polymeric siloxane.

While it is desirable to utilize highly M rich chain terminating compounds in reaction 1), the nature of the substituents on the M unit may be varied to impart additional functionality to the product of reaction 3). For example, one of the R groups on the M group may contain olefinic unsaturation. Thus a copolymer that is simultaneously an hydride and an alkenyl organosiloxane may be prepared by reacting an M-rich compound containing an alkenyl substitution in the initial ring-opening polymerization to produce an alkenyl stopped intermediate that is then condensed and redistributed to produce the di-functional compound $M^{vi}D^H_pD_qM^{vi}$
where $M^{vi}=M$ where one or more of $R^4$, $R^5$ and $R^6$ is a monovalent alkenyl radical.

Alternatively, the M-rich compound used as a chain-stopping agent in the initial ring-opening polymerization may be fairly conventional, such as a trimethyl stopped compound, but the cyclic compound is functionalized, e.g. a tetramer where one of the R groups on each D unit is a monovalent alkenyl radical, e.g. $D^{vi}$, an idiosyncratic symbol for an alkenyl containing D group, where the superscript vi indicates that one or more of $R^1$ and $R^2$ is a monovalent alkenyl radical. Similarly the superscript Ph indicates that one or more of $R^1$ and $R^2$ is a phenyl or other aromatic radical. Because of the unique selectivity of this reaction sequence, the cyclic compounds which are the starting materials may also be functionalized. Thus if one of the R groups on the D units comprising the cyclic organosiloxanes is an alkenyl group, an alkenyl on chain, hydride on chain copolymer may be prepared, e.g. $M^{vi}D^H_pD^{vi}_qM^{vi}$.

Instead of utilizing a single cyclic species for the ring-opening polymerization, mixtures of cyclic species may be employed and each cyclic species may be differently functionalized to prepare complex copolymers that are then reacted to form complex hydride copolymers. Such materials have the general formula:

$$MD^H_pD^1_{q1}D^2_{q2}\ldots D^n_{qn}T_rQ_sM_u$$

where $D^H_p \neq D^1_{q1} \neq D^2_{q2} \neq \ldots \neq D^n_{qn}$, i.e. none of the various D's are alike, and the subscripts qi through qn, for all n different D groups, satisfy the definition for the subscript q as previously defined and the subscripts r, s, and u in the units $T_r$, $Q_s$, $M_u$ which are tri-functional, tetrafunctional or monofunctional units range over the same values as p or q.

Thus the difunctional compound
$M^{vi}D^H_pD_qM^{vi}$
where $M^{vi}=M$ where one or more of $R^4$, $R^5$ and $R^6$ is an alkenyl group is a member of this series; the difunctional compound
$MD^H_pD^{vi}_qM$ where $D^{vi}=D$ where $R^1$ or $R^2$ is an alkenyl group is a member of this series; the trifunctional compound:
$M^{vi}D^H_pD^{vi}_qM^{vi}$
is a member of this series. By a ring opening polymerization of two cyclic species, e.g. $D_{q1}$ and D, a copolymer results from the first stage reaction. By a ring opening polymerization of more than two cyclic species, e.g. $D^1_{q1}$, $D^2_{q2}$, ... $D^n_{qn}$ and D, a higher order polymer results from the first stage reaction. The precursors containing the different D groups, $D^1_{q1} \neq D^2_{q2} \neq \ldots \neq D^n_{qn}$, may be differently functionalized leading to a multi-functionalized first stage product. Further, choice of a functionalized or non-functionalized M rich compound leads to an initial product that is non-functionalized or functionalized at the terminal positions of the molecule as the case may be. The second stage reactant may be differently functionalized from the first stage product so that di, tri-, tetra- functionalized copolymers or terpolymers and the like may result from the second stage reaction.

Thus the process of the present invention enables the production of the following new compositions of matter:
$M^{vi}D^H_pD_qM^{vi}$, the T, Q and TQ variants $M^{vi}D^H_pD_qT_rM^{vi}$, $M^{vi}D^H_pD_qQ_sM^{vi}$, and $M^{vi}D^H_pD_qT_rQ_sM^{vi}$;
$MD^H_pD^{vi}_qM$, the T, Q and TQ variants $MD^H_pD^{vi}_qT_rM$, $MD^H_pD^{vi}_qQ_sM$, and $MD^H_pD^{vi}_qT_rQ_sM$;
$M^{vi}D^H_pD^{vi}_qM^{vi}$, the T, Q and TQ variants $M^{vi}D^H_pD^{vi}_qR_rM^{vi}$, $M^{vi}D^H_pD^{vi}_qQ_sM^{vi}$, and $M^{vi}D^H_pD^{vi}_qT_rQ_sM^{vi}$;
$M^{vi}D^H_pD^1_{q1}D_{q2}M^{vi}$, the T, Q and TQ variants $M^{vi}D^H_pD^1_{q1}D_{q2}T_rM^{vi}$, $M^{vi}D^H_pD^1_{q1}D_{q2}Q_sM^{vi}$, and $M^{vi}D^H_pD^1_{q1}D_{q2}T_rQ_sM^{vi}$;
$MD^H_pD^{vi}_{q1}D_{q2}M$, the T, Q and TQ variants $MD^H_pD^{vi}_{q1}D_{q2}T_rM$, $MD^H_pD^{vi}_{q1}D_{q2}Q_sM$, and $MD^H_pD^{vi}_{q1}D_{q2}T_rQ_sM$;
$M^{vi}D^H_pD^{vi}_{q1}D_{q2}M^{vi}$, the T, Q and TQ variants $M^{vi}D^H_pD^{vi}_{q1}D_{q2}R_rM^{vi}$, $M^{vi}D^H_pD^{vi}_{q1}D_{q2}Q_sM^{vi}$, and $M^{vi}D^H_pD^{vi}_{q1}D_{q2}T_rQ_sM^{vi}$; the higher order polymers based on $D^1_{q1} \neq D^2_{q2} \neq \ldots \neq D^n_{qn}$ and the T, Q and TQ variants thereof, and the like.

All United States patents referenced herein are herewith and hereby incorporated by reference.

Definitions

It is explicitly noted that where exemplary reactions recite generic reactants that mixtures of species of reactants satisfying the genus definition may be substituted therefore.

Applicants define M rich silicone compounds to be those silicones where the ratio of M groups to the sum of D, T, and Q groups present in the molecule is 0.04 or greater. That is by way of explanation given a silicone of the general formula $M_iD_jT_kQ_h$, the subscripts j, k, and h are integers that are zero or positive and i is a positive non-zero integer, an M rich silicone is defined as one where the subscripts satisfy the criterion $(i/(j+k+h)) \geq 0.04$, preferably this ratio is 0.10 or greater, more preferably this ratio is 0.15 or greater, and most preferably this ratio is 0.20 or greater. M, D, T and Q have the usual definitions of structural silicone chemistry, that is M is a monofunctional chain terminating organosiloxyl group i.e. $M=R^4R^5R^6SiO_{1/2}$ where $R^4$, $R^5$ and $R^6$ are each independently selected from the group consisting of hydrogen and one to forty carbon atom monovalent hydrocarbon radicals, D is a difunctional chain building or repeating organosiloxyl group, i.e. $D=SiR^1R^2O_{2/2}$ with $R^1$ and $R^2$ independently selected from hydrogen and one to forty carbon atom monovalent hydrocarbon radicals (when $R^1$ or $R^2$ is hydrogen $D=D^H$ and when one of the R groups is alkenyl, $D^{vi}$), T is a trifunctional chain branching organofunctional unit, i.e. $T=R^7SiO_{3/2}$ where $R^7$ selected from the group consisting of hydrogen and one to forty carbon atom monovalent hydrocarbon radicals and Q is a tetrafunctional unit $SiO_{4/2}$.

Applicants have recited a broad genus of substituent groups that may be utilized in preparing compounds of the present invention. The phrase one to forty carbon atom monovalent hydrocarbon radicals includes linear alkyl, branched alkyl, linear alkenyl, branched alkenyl, linear alkynyl, branched alkynyl, halogen substituted linear alkyl, halogen substituted branched alkyl, halogen substituted linear alkenyl, halogen substituted branched alkenyl, halogen substituted linear alkynyl, halogen substituted branched alkynyl, aryl, alkylaryl, alkenylaryl, alkynylaryl, halogen substituted aryl, halogen substituted alkylaryl, halogen substituted alkenylaryl, and halogen substituted alkynylaryl. By halogen substituted, Applicants define a substituent satisfying the requirement that at least one hydrogen position of the hydrocarbon radical is replaced with or substituted by a halogen selected from the group consisting of fluorine, chlorine, bromine, or iodine. A preferred subset of one to forty carbon atom monovalent hydrocarbon radicals includes the group of monovalent radicals consisting of hydrogen, linear or branched alkyl radicals having from 1 to about 10 carbon atoms, linear or branched alkenyl radicals having from 2 to about 10 carbon atoms, linear or branched alkynyl radicals having from 2 to about 10 carbon atoms, cycloalkyl radicals having from 3 to about 12 carbon atoms, cycloalkenyl radicals having from about 3 to 12 carbon atoms, cycloalkynyl radicals having from about 8 to about 16 carbon atoms, fluorinated linear or branched alkyl radicals having from 1 to about 10 carbon atoms, chlorinated linear or branched alkyl radicals having from 1 to about 10 carbon atoms, brominated linear or branched alkyl radicals having from 1 to about 10 carbon atoms, fluorinated linear or branched alkenyl radicals having from 2 to about 10 carbon atoms, chlorinated linear or branched alkenyl radicals having from 2 to about 10 carbon atoms, brominated linear or branched alkenyl radicals having from 2 to about 10 carbon atoms, fluorinated linear or branched alkynyl radicals having from 2 to about 10 carbon atoms, chlorinated linear or branched alkynyl radicals having from 2 to about 10 carbon atoms, brominated linear or branched alkynyl radicals having from 2 to about 10 carbon atoms, hydrocarbonoxy radicals containing at least two carbon atoms, fluorinated hydrocarbonoxy radicals containing at least two carbon atoms, chlorinated hydrocarbonoxy radicals containing at least two carbon atoms, brominated hydrocarbonoxy radicals containing at least two carbon atoms aryl radicals, linear or branched alkyl aryl radicals, fluorinated aryl radicals, chlorinated aryl radicals, brominated aryl radicals; fluorinated linear or branched alkyl-, alkenyl-,or alkynyl aryl radicals; chlorinated linear or branched alkyl-, alkenyl-, or alkynyl aryl radicals; brominated linear or branched alkyl-, alkenyl-, or alkynyl aryl radicals. More preferred monovalent hydrocarbon radicals are selected from the group consisting of methyl, ethyl, propyl, trifluoropropyl, butyl, vinyl, allyl, styryl, phenyl, and benzyl. Most preferred monovalent hydrocarbon radicals are selected from the group consisting of methyl, vinyl, trifluoropropyl, and phenyl.

A copolymer is usually defined as the polymerized product of two monomers; copolymers is used in this specification in a broader sense. This broader definition of copolymers includes not only copolymers themselves, but also includes higher order mixed polymers such as terpolymers (three monomers) and higher order mixed polymers (four or more). The process of the present invention renders the synthesis of such higher order mixed polymers particularly convenient as a mixture of cyclic siloxanes may be employed in the first stage ring opening polymerization leading to a mixed polymer of order n where n is the number of cyclic species or monomers utilized in the ring opening polymerization. The second stage reaction thus increases the polymeric order to n+1 if only one species is used in the second stage and if a mixture having m members is used then the final polymer is a higher order polymer having order n+m. As used herein, a polymer of order 2 is a copolymer, a polymer of order 3 is a terpolymer, etc. Thus Applicants define polymeric order on the basis of chemically distinguishable D groups present in the resulting polymer, the number of different D groups being the polymeric order.

The term $D^n_{qn}$ refers to a set of $D_q$ having two or more members where the n is a counting index counting the different number of $D_q$. Thus the first set consists of $D^1_{q1}$ and $D^2_{q2}$. The second set consists of $D^1_{q1}$, $D^2_{q2}$, and $D^3_{q3}$. The counting index n defines both the minimum number of different D groups and the minimum polymer order of the resulting compound. When superscripts indicative of functionalization are used, i.e. an idiosyncratic superscript, in the specification, they have been used to define a functionality present in a D group, e.g. H, vi, Ph, i.e. $D^H$, $D^{vi}$, and $D^{Ph}$, and the like, which denotes a particular specie of D group. If idiosyncratic superscripts are not used, n defines absolutely the number of different D groups and the polymer order. The term $D_q$ stands for a single D unit that may be varied at will.

Experimental

The following non-limiting examples are intended to illustrate the invention.

EXAMPLE 1

A 500 mL round bottom flask was charged with 229.55 g, 3.10 moles, of octamethylcyclotetrasiloxane ($D_4$), 1.92 g, 0.0124 moles, decamethyl tetrasiloxane ($MD_2M$, M rich compound, M/(M+D)=0.50, molar basis), and 0.27 g of 4.3 weight percent KOH in a low molecular weight polydimethylsiloxane oil (a silanolate catalyst) having an effective base concentration of 50 ppm. The reaction was heated for 3 hours at 150° C. Having achieved equilibrium, 87–88 weight percent solids, the reaction mixture was cooled to 80°–90° C. and 1.62 g of 2 weight percent solution in a 20 centistokes (cSt) polydimethylsiloxane oil linear of a phosphonitrilic chloride having the formula $(Cl_3P(NPCl_2)_2PCl_3)^+PCl_6^{-31}$ was added (effective concentration 138 ppm). The phosphonitrilic chloride neutralized the potassium silanolate catalyst leaving approximately 100 ppm of the linear phosphonitrilic chloride to act as a catalyst. The mixture was stirred for one hour at 80°–90° C. at which time 2.23 g of 1.62 weight percent hydride linear silicone hydride polymer ($MD^H_{40-50}M$) was added. The reaction was stirred for an additional 2 hours at 80°–90° C. The resulting product was clear and colorless and had a hydride content of 155 ppm with a viscosity of 2275 cSt at 25° C. Silicon-29 NMR indicated that Si-H groups were randomly placed throughout the polymer chain. The hydride polymer so produced was subsequently successfully utilized for hydrosilation without further purification or filtration.

EXAMPLE 2

The procedure of example 1 was repeated using 623 pounds of octamethylcyclotetrasiloxane, 5.2 pounds decamethyl tetrasiloxane, 0.396 pounds of 4.9 weight percent potassium hydroxide in silicone oil to yield 30 ppm effective catalyst, 3.92 pounds of a 2 weight percent phosphonitrilic chloride catalyst in 20 cSt silicone oil, and 6.22 pounds of 1.622 weight percent hydride silicone hydride polymer. The resulting product had viscosity of 2210 cSt at 25° C. and a hydride content of 160 ppm. Silicon-29 NMR indicated that Si-H groups were randomly placed throughout the polymer chain. The hydride polymer so produced was subsequently successfully utilized for hydrosilation without further purification or filtration.

EXAMPLE 3

The rapid achievement of equilibrium in the ring opening polymerization requires the presence of the base catalyst. The following attempts (Table 1) to ring open polymerize utilizing only the phosphonitrilic halide catalyst indicate that synthesis of the hydride copolymer is significantly faster using two catalysts sequentially.

TABLE 1

Preparation of Hydride Silicone Copolymers Using Only a Single Catalyst

| Reactants | Conditions | Wt. % Solids | Viscosity, cSt | % Approach to Equilibrium |
|---|---|---|---|---|
| Viscasil ™ MD$_2$M, silicone hydride polymer[1] | 80° C., 6 hrs., 60 ppm LPNC[2] | 95 | 1910 | 40 |
| D$_4$, MD$_2$M, silicone hydride polymer[1] | 80° C., 24 hrs., 100 ppm LPNC[2] | 86 | 2192 | 98 |
| D$_4$, MD$_2$M, silicone hydride polymer[1] | 80° C., 24 hrs., 50 ppm LPNC[2] | 82 | 1600 | 94 |

Notes to Table 1:
[1] 1.62 weight percent hydride linear silicone hydride polymer.
[2] the LPNC used had the formula (Cl$_3$P(NPCl$_2$)$_2$PCl$_3$)$^+$PCl$_6^-$.

The results of Table 1 indicate that in contrast to achieving equilibrium in a total of approximately 5 to 10 hours (ring opening polymerization 3–6 hours, redistribution and condensation 2–6 hours), the unaided LPNC catalyst requires more than 24 hours. Thus reaction efficiency is increased by catalyzing the two reactions separately and using a first stage catalyst that can be neutralized by the second stage catalyst.

EXAMPLE 4

Preparation of $M^{vi}D^H_pD_qM^{vi}$ (p=3, q=219)

$M^{vi}D^H_3D_{219}M^{vi}$, $M^{vi}=(CH_3)_2CH_2=CHSiO_{3/2}$, $D^H=(CH_3)HSiO_{2/2}$, $D=(CH_3)_2SiO_{2/2}$, A 500 mL round-bottom flask was charged with 223.63 g octamethylcyclotetrasiloxane, 2.24 g 1,3-divinyl-1, 1, 3, 3-tetramethyl disiloxane in the presence of a silanolate catalyst, 0.27 g of 4.3 wt. % KOH in a s siloxane oil (50 ppm). The reaction was stirred for 3 hours at 150° C. The resulting product was 87.3% solids, which is indicative of an equilibrium product. The reaction was cooled to between 80°–90° C. After cooling, the LPNC catalyst was added, 1.62 g of a 2 wt. % solution in a 20 cSt viscosity silicone oil (143 ppm). The reaction was stirred at the lower temperature for 1 hour before the addition of 2.46 g of a linear silicone hydride polymer having 1.62 weight percent hydride. The reaction was stirred at 80°–90° C. for an additional 2 hours. The product was a slightly hazy fluid that was filtered through a 2:1 weight mixture of Celite™ and Fuller's Earth. The filtered product was clear and colorless having a viscosity of 544 cSt at 25° C. and a hydride content of 170 ppm. Silicon-29 NMR indicated both the presence of terminal alkenyl groups and that the hydride had been randomly incorporated into the silicone chain.

EXAMPLE 5

Preparation of $MD_{q1}D^{vi}_{q2}D^H_pM$ (p=10, q1=350, q2=10)

$MD_{350}D^{vi}_{10}D^H_{10}M$: The procedure of example 4 was repeated using 175.77 g of octamethylcyclotetrasiloxane, 1.92 g of decamethyltetrasiloxane, 4.97 g of tetramethyltetravinylcyclotetrasiloxane, 0.21 g of 0.27 g of 4.3 wt. % KOH in a siloxane oil (49 ppm), 1.62 g of LPNC catalyst solution (177 ppm) and 3.46 g of a linear silicone hydride polymer having 1.62 weight percent hydride. The clear and colorless product had a viscosity of 883 cSt at 25° C. and a hydride content of 288 ppm. Silicon-29 NMR indicated that both the alkenyl group and the hydride groups had been randomly incorporated into the silicone chain (chemical shifts: $D^H=-37.5$ ppm, $D^{vi}=-35.8$ ppm). This reaction is an example of using a mixture of cyclic species in the ring opening polymerization to synthesize a silicone terpolymer, three precursors (monomers) containing three different D groups, minimum polymeric order=3.

EXAMPLE 6

Preparation of $MD_{q1}D^{Ph}_{q2}D^{vi}_{q3}D^H_pM$ (p=10, q1=350, q2=10, q3=10)

$MD_{350}D^{Ph}_{10}D^{vi}_{10}D^H_{10}M$: $D^{Ph}$ is an idiosyncratic designation for a D group having both R groups substituted by phenyl groups. The procedure employed in examples 4 and 5 was repeated using 490.0 g of octamethylcyclotetrasiloxane, 164.5 g of octaphenylcyclotetrasiloxane, 12.92 g of decamethyltetrasiloxane, 35 g of tetramethyltetravinylcyclotetrasiloxane, 0.82 g of 4.3 wt. % KOH in a siloxane oil (50 ppm), 4.92 of LPNC catalyst solution (140 ppm) and 24.4 g of a linear silicone hydride polymer having 1.62 weight percent hydride. The clear and colorless product had a viscosity of 613 cSt at 25° C. and a hydride content of 555 ppm. Silicon-29 NMR indicated that the phenyl, hydride and alkenyl groups were randomly incorporated into the silicone chain (chemical shifts: $D^{Ph}_{10}=$ 48.0 ppm, $D^{Ph}_{10}$ $D^H=-37.5$ ppm, $D^{vi}=-35.8$ ppm). This reaction is an example of using a mixture of cyclic species in the ring opening polymerization to synthesize a silicone terpolymer, at least four precursors containing four different D groups, minimum polymeric order=4.

Having described the invention that which is claimed is:
1. A process for the production of siloxane copolymers comprising:
(a) polymerization of a cyclic siloxane and an M rich siloxane in the presence of a basic catalyst to produce a polymeric siloxane;
(b) neutralization of the basic catalyst with an excess of a catalytic Lewis acid compound; and
(c) reacting a second siloxane with the polymeric siloxane in the presence of the catalytic Lewis acid compound producing thereby a copolymeric siloxane.

2. The process of claim 1 wherein the catalytic Lewis acid compound is a phosphonitrilic compound selected from the group consisting of 1) $(X_3P(NPX_2)_nPX_3)^+PX_6^-$ where n is an integer of from 1 to 6 and X is a halide;

2) $(X_3P(NPX_2)_nNPX_3)^+PX_6^-$ where n is an integer of from 1 to 6 and X is a halide;

3) $(X_3P(NPX_2)_nNPX_3)^+EX_m^-$ where E is an element having an electronegativity value of from 1.2 to 2 with m an integer of from 3 to 8 and X is a halide;

4) $O(X)_{2-a}Y_aP(NPX_2)_bNPX_{3-c}Y_c$ where b is an integer ranging from 0 to 8, a is 0 or 1, c is 0 or 1, Y is OH, OR' or R'CO$_2$ where R' is alkyl or aryl and X is a halide;

5) $O(X)_{2-a}Y_aP(NPX_2)_bNP(O)X_{2-c}Y_c$ where b is an integer ranging from 0 to 8, a is 0 or 1, c is 0 or 1, Y is OH, OR' or R'CO$_2$ where R' is alkyl or aryl and X is a halide;

6) $X_{3-p}(HO)_pP(NPX_2)_mNP(O)X_2$, where m is an integer ranging from 0 to 6 and p is 0 or 1 and X is a halide; and 7) $X_3P(NPX_2)_mNPX_2(O)$ where m values can vary from 0 to 6 and X is a halide.

3. The process of claim 2 where X is selected from the group consisting of F, Cl, Br, and I.

4. The process of claim 3 where E is selected from the group consisting of Al, Sb, P, Sn, Zn and Fe.

5. The process of claim 4 where the phosphonitrilic compound has the formula $(X_3P(NPX_2)_nPX_3)^+PX_6^-$.

6. The process of claim 5 where n=2.

7. The process of claim 6 where X is Cl.

8. The process of claim 7 where the M rich compound comprises M groups having the formula:

$M=R^4R^5R^6SiO_{1/2}$ where $R^4$, $R^5$ and $R^6$ are each independently selected from the group consisting of hydrogen and one to forty carbon atom monovalent hydrocarbon radicals subject to the limitation that at least one of $R^4$, $R^5$ and $R^6$ is a two to forty carbon atom monovalent alkenyl hydrocarbon radical.

9. The process of claim 8 where the second siloxane comprises a hydrogen organosiloxane compound.

10. A process for the production of siloxane copolymers consisting essentially of:

(a) polymerization of a cyclic siloxane and an M rich siloxane in the presence of a basic catalyst to produce a polymeric siloxane;

(b) neutralization of the basic catalyst with an excess of a catalytic Lewis acid compound; and (c) reacting a second siloxane with the polymeric siloxane in the presence of the catalytic Lewis acid compound producing thereby a copolymeric siloxane.

* * * * *